US009292617B2

(12) United States Patent
Chandra (10) Patent No.: US 9,292,617 B2
(45) Date of Patent: *Mar. 22, 2016

(54) METHOD AND APPARATUS FOR ENABLING CONTENT PORTION SELECTION SERVICES FOR VISITORS TO WEB PAGES (71) Applicant: Rohit Chandra, Sunnyvale, CA (US)

(72) Inventor: Rohit Chandra, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/831,331

(22) Filed: Mar. 14, 2013

(65) Prior Publication Data

US 2014/0281887 A1 Sep. 18, 2014

(51) Int. Cl.
G06F 17/00 (2006.01)
G06F 17/30 (2006.01)

(52) U.S. Cl.
CPC .............................. *G06F 17/30899* (2013.01)

(58) Field of Classification Search
CPC ..................... G06F 17/241; G06F 17/30899
USPC ................ 715/230, 231, 233, 234, 206
See application file for complete search history.

(56) References Cited

U.S. PATENT DOCUMENTS

| | | | |
|---|---|---|---|
| 5,727,129 A | 3/1998 | Barrett et al. | |
| 5,757,371 A | 5/1998 | Oran et al. | |
| 5,802,299 A | 9/1998 | Logan et al. | |
| 5,958,008 A | 9/1999 | Pogrebisky et al. | |
| 5,982,370 A | 11/1999 | Kamper | |
| 6,065,057 A | 5/2000 | Rosen et al. | |
| 6,088,702 A * | 7/2000 | Plantz et al. | |
| 6,184,878 B1 * | 2/2001 | Alonso et al. | 725/109 |
| 6,199,077 B1 | 3/2001 | Inala et al. | |
| 6,240,444 B1 | 5/2001 | Fin et al. | |
| 6,260,192 B1 | 7/2001 | Rosin et al. | |
| 6,282,548 B1 | 8/2001 | Burner et al. | |
| 6,338,117 B1 | 1/2002 | Challenger et al. | |
| 6,339,767 B1 | 1/2002 | Rivette et al. | |
| 6,456,304 B1 | 9/2002 | Angiulo et al. | |
| 6,490,602 B1 | 12/2002 | Karaemer | |
| 6,493,733 B1 | 12/2002 | Pollack et al. | |
| 6,563,913 B1 | 5/2003 | Kaghhazian | |
| 6,600,503 B2 | 7/2003 | Stautner et al. | |
| 6,711,585 B1 | 3/2004 | Copperman et al. | |
| 6,769,015 B1 | 7/2004 | Bates et al. | |
| 6,850,986 B1 | 2/2005 | Peacock | |
| 7,269,787 B2 * | 9/2007 | Amitay et al. | 715/230 |
| 7,284,008 B2 | 10/2007 | Henkin et al. | |
| 7,315,848 B2 | 1/2008 | Pearse et al. | |
| 7,506,253 B2 | 3/2009 | Armstrong | |
| 7,519,562 B1 | 4/2009 | Vander Mey et al. | |
| 7,533,090 B2 | 5/2009 | Agarwal et al. | |
| 7,539,656 B2 | 5/2009 | Fratkina et al. | |

(Continued)

*Primary Examiner* — Stephen Hong
*Assistant Examiner* — Matthew Ludwig (57) ABSTRACT A method and user interface object for invoking a content selection service to operate with a web page are disclosed. Consistent with one embodiment of the invention, a content selection web portal associated with a content selection service provides a web page for selecting one or more user interface objects to be added to a content provider's web page. Each user interface object is displayed with its associated snippet of code, making it simple for a web author to copy and paste the code into his or her own web page. Once embedded in a web page, the code snippet displays a user interface object (e.g., button) on the web page, and when pressed or selected, invokes a content selection service. Alternatively, the content selection service may be automatically invoked without requiring the selection of a button.

20 Claims, 9 Drawing Sheets

(56) References Cited

U.S. PATENT DOCUMENTS

| | | | |
|---|---|---|---|
| 7,603,437 B2 | 10/2009 | Busey | |
| 7,693,817 B2 | 4/2010 | Dumais et al. | |
| 7,702,811 B2 | 4/2010 | Gopalan et al. | |
| 7,925,993 B2 | 4/2011 | Williams | |
| 7,941,444 B2 * | 5/2011 | Cragun et al. | 707/784 |
| 7,996,396 B2 | 8/2011 | Leblang et al. | |
| 8,090,706 B2 | 1/2012 | Bharat | |
| 8,131,779 B2 | 3/2012 | Jonker et al. | |
| 8,150,824 B2 | 4/2012 | Marmaros et al. | |
| 8,195,772 B2 | 6/2012 | Marmor | |
| 8,276,061 B2 * | 9/2012 | Joshi et al. | 715/230 |
| 8,631,001 B2 | 1/2014 | Lawrence et al. | |
| 2001/0000537 A1 | 4/2001 | Inala et al. | |
| 2001/0044720 A1 | 11/2001 | Lee et al. | |
| 2001/0051987 A1 | 12/2001 | Fukumoto et al. | |
| 2002/0007379 A1 | 1/2002 | Wang et al. | |
| 2002/0023072 A1 | 2/2002 | Stern et al. | |
| 2002/0049738 A1 | 4/2002 | Epstein | |
| 2002/0059343 A1 | 5/2002 | Kurishima et al. | |
| 2002/0059369 A1 | 5/2002 | Kern et al. | |
| 2002/0065802 A1 | 5/2002 | Uchiyama | |
| 2002/0069296 A1 | 6/2002 | Aua et al. | |
| 2002/0076053 A1 | 6/2002 | Hachimura | |
| 2002/0129375 A1 | 9/2002 | Kim et al. | |
| 2003/0025731 A1 | 2/2003 | Chastain et al. | |
| 2003/0050927 A1 | 3/2003 | Hussam | |
| 2003/0081000 A1 * | 5/2003 | Watanabe et al. | 345/751 |
| 2003/0187886 A1 | 10/2003 | Hull et al. | |
| 2004/0205065 A1 | 10/2004 | Petras et al. | |
| 2004/0205541 A1 * | 10/2004 | D'Amico | 715/512 |
| 2004/0225716 A1 | 11/2004 | Shamir et al. | |
| 2005/0010475 A1 | 1/2005 | Perkowski et al. | |
| 2005/0086634 A1 | 4/2005 | Bates et al. | |
| 2005/0149576 A1 * | 7/2005 | Marmaros et al. | 707/200 |
| 2005/0160167 A1 | 7/2005 | Cheng et al. | |
| 2005/0256866 A1 | 11/2005 | Lu et al. | |
| 2006/0004711 A1 | 1/2006 | Naam | |
| 2006/0004734 A1 | 1/2006 | Malkin et al. | |
| 2006/0036565 A1 | 2/2006 | Bruecken | |
| 2006/0041625 A1 | 2/2006 | Chen et al. | |
| 2006/0048046 A1 | 3/2006 | Joshi et al. | |
| 2006/0053365 A1 | 3/2006 | Hollander et al. | |
| 2006/0136451 A1 | 6/2006 | Denissov | |
| 2006/0143236 A1 | 6/2006 | Wu | |
| 2006/0282336 A1 | 12/2006 | Huang | |
| 2006/0282795 A1 | 12/2006 | Clark et al. | |
| 2006/0287971 A1 | 12/2006 | Armstrong | |
| 2007/0143345 A1 | 6/2007 | Jones et al. | |
| 2007/0192314 A1 | 8/2007 | Heggem | |
| 2007/0234209 A1 * | 10/2007 | Williams | 715/700 |
| 2007/0250582 A1 | 10/2007 | Sidhu et al. | |
| 2008/0016169 A1 | 1/2008 | Kaghazian | |

* cited by examiner

NEWS.com

WORLD U.S. REGION BUSINESS TECHNOLOGY SCIENCE HEALTH SPORTS OPINION STYLE TRAVEL
POLITICS WASHINGTON EDUCATION

Clinton Camp Turns to a Star in Money Race

Concerned about Senator Barack Obama's presidential fund-raising, Senator Hillary Rodham Clinton's campaign has dispatched former President Bill Clinton to attend 16 fund-raisers in the last six weeks and to lead conference calls and Internet appeals to donors, in some cases assessing Mr. Obama's positions on Iraq.

Democrats close to the couple say that Mr. Clinton's efforts on his wife's behalf were just beginning and that they were likely to accelerate after he finishes writing a book this spring. Several donors said that Mr. Clinton's role was even greater than they originally expected after Mrs. Clinton announced her candidacy on Jan. 20.

The early deployment of Mr. Clinton highlights the continuing concerns in the Clinton camp about the strength of Mr. Obama's candidacy and his fund-raising prowess. The Clinton camp has tried to stop any drift of Democratic donors to the Obama camp, since the campaign finance reporting period ending tonight is seen as a huge test of the campaigns' money-raising abilities as they gird for a crush of early primaries.

SIGN IN TO EMAIL
OR SAVE THIS

PRINT

HIGHLIGHT IT — 66

SINGLE PAGE

REPRINTS

SHARE

FIG. 6

FILE   EDIT   VIEW   BOOKMARKS   TOOLS   HELP

⬅ ➡ ⟲ ✖ 🏠   HTTP://www.myblog.com

MyBlog.com

FRIDAY, MAY 5, 2007

ATITITES...

Author Martha Peace wrote a book some years back titled "Attitudes of a Transformed Heart." The premise of her work is Romans 12:2, i.e., be "transformed by the renewing of your mind" and not being "conformed to this world." Non-Christians and Christians alike often embrace a low view of God, and consequently a casual view of sin and Scripture. Instead of perceiving God as "Most High", they attempt to make God subservient to man by thinking of "Man (as) Most High." This low view of God is reflected in their attitudes about God, their attitudes about Scripture, and their attitudes of the heart.

[ 🖌 HIGHLIGHT IT ] — 68

BLOG ARCHIVE

▽ 2007
　▽ MAY (1)
　▽ APRIL (7)

METHOD AND APPARATUS FOR ENABLING CONTENT PORTION SELECTION SERVICES FOR VISITORS TO WEB PAGES

RELATED APPLICATIONS

The present application is a continuation-in-part of U.S. patent application Ser. No. 11/766,786 filed on Jun. 21, 2007. U.S. patent application Ser. No. 11/766,786 claims the benefit of U.S. Provisional Patent Application with Ser. No. 60/815,467 filed on Jun. 22, 2006, the contents of both of these applications are hereby incorporated herewith. Further. U.S. Pat. No. 7,966,623 filed on Jun. 22, 2007 is also incorporated into the present application.

FIELD

The present invention relates generally to computer network-based information retrieval and sharing techniques. More particularly, the present invention relates to methods and systems that enable content providers and authors of web-based content to enable content portion selection functionality on their web pages for better visibility, later retrieval and/or sharing with one or more other users.

BACKGROUND

A wealth of information is available on the Internet, and particularly that segment of the Internet referred to generally as the World Wide Web. However, despite vast improvements in search engines, finding the particular information that one is interested in can still be a challenging and time-consuming task. Perhaps even more frustrating is the lack of tools available to enable a user to retrieve previously searched for and discovered information. In the realm of search and retrieval, search engines aid in the search but leave much to be desired when it comes to information retrieval.

One common mechanism used for information retrieval is referred to generally as a bookmark. A bookmark is a mechanism or function enabling a user to save a copy of a uniform resource locator (URL). For example, if a user finds an article of interest at URL, http://www.interesting-article.com/article_12345.htm, the user can save the URL as a bookmark so that at a later time the user can simply select (e.g., with a mouse or other pointing device) the bookmark to reload the document associated with the URL. Users might choose to categorize the bookmarks. Traditionally, bookmarks have been facilitated by a web browser application and stored at the computer on which the web browser application resides. However, more recently online bookmarking services have provided users with a way to store bookmarks online, making the bookmarks accessible from any network-connected computer.

As a means of information retrieval, bookmarks have several shortcomings. One problem with bookmarks is they provide little, if any, explanation or context as to what it is about the associated document that may be significant. For instance, a bookmark simply associates a URL with a document. A user may generate a bookmark for a particular web page because of a single passage in an article, or a particular blog entry on a web page with many blog entries. When the user retrieves the web page at a later time by means of selecting the bookmark, the user may not be able to remember what it is that is significant about the web page and why he or she saved the bookmark in the beginning.

Another problem with bookmarks is that they become stale, and in some cases expire, over time. For instance, an internet document may change between the time that a user generates a bookmark, and then revisits the associated web page at a later time. In some cases, a URL may expire altogether. For example, the document associated with the URL may be removed from the server such that the URL returns an error message indicating the document no longer exists.

Another problem with bookmarks is they are a less than ideal mechanism for sharing information. For example, to share information with a bookmark facilitated by a web browser application, a user must generally email the bookmark to another user. When the recipient receives the email including the bookmark, the user must select the link—if the bookmark is implemented as a user-selectable link—in order to initiate loading of the associated document in the user's web browser application. Often the bookmark is not a user-selectable link. In this case, the user must copy-and-paste, or type, the corresponding URL of the bookmark into the address bar of the web browser application. The copy-and-paste method sometimes does not work because of special characters, such as carriage return and line feed characters, in the URL. In any case, the additional steps required to access the relevant document are often viewed as burdensome. Often it is only a subset of individuals who end up going through the process necessary to load the relevant document. When the relevant document is finally loaded into and displayed by the recipient's web browser, the recipient of the bookmark may not appreciate the relevance of the associated document.

Web-based content providers, such as news websites and/or blog websites often provide users with a button enabling the user to generate and send an email including a hyperlink back to a news story or blog entry, or a copy of the news story or blog entry embedded in the email. Accordingly, if a friend would like to share a news story from a news website or a blog entry from a blog website, the user can simply press (e.g., with a mouse or pointing device) a graphical user interface button to generate an email with an embedded copy of, or a link to, the relevant web page. The recipient of the email can then view the relevant web page, either directly in the email, or by selecting a hyperlink in the email.

Sharing content in this manner has a few drawbacks. First, because many websites generate emails that only include a hyperlink back to a relevant web page, as opposed to an embedded copy of the relevant web page, recipients of such emails must go through the process of loading the relevant web page by selecting, copying and pasting, or typing the relevant URL of the hyperlink. This means that a recipient of the email must select (e.g., with a mouse or pointing device) the hyperlink in the email in order to retrieve the relevant article with his or her web browser application. Many users would rather not be bothered with this extra step. Furthermore, after the recipient has retrieved the relevant web page with a web browser, he or she may still not appreciate the relevance of the specific content. That is, the recipient may not understand or realize the significance of the web page as a whole, and therefore may not spend the time necessary to read and understand the content.

SUMMARY

A method for invoking a highlighting service to operate with a web page are disclosed. According to one embodiment of the invention, a content provider server serves an internet document to a client web browser. The internet document includes code that causes the client web browser to invoke a highlighting service to operate with the internet document. In an alternative embodiment, the internet document served by the content provider includes a user interface object that enables a user to optionally invoke the highlighting service. For example, the user might invoke the highlighting service by interacting with the user interface object (e.g., by selecting or traversing the user interface object). Depending upon the embodiment, the highlighting service may be invoked directly by the client web browser, or indirectly via an agent of the content provider server and/or an agent of the highlighting service provider. For example, the client web browser may directly communicate a request to the server hosting the highlighting service when a user interacts with the user interface object. Alternatively, the client web browser may communicate a request to a software agent operating in conjunction with the content provider server. Accordingly, the software agent will relay the request to the highlighting service.

In another embodiment of the invention, a server associated with (e.g., hosting) the highlighting service includes a web page, providing users of the highlighting service access to various features of the highlighting service. The web page serves an internet document including a snippet of code that can be inserted into a content provider's internet document or web page by simply copying and pasting the code snippet. For example, in one embodiment, the code snippet represents a user interface object with associated code. When the content provider serves the internet document including the code snippet, the user interface object is displayed. When a user interacts with the user interface button (e.g., by selecting it), a highlighting service hosted by the highlighting server is invoked, thereby enabling users to selectively highlight portions of the content provider's internet document or web page.

Other aspects of the invention will be described in greater detail below, in connection with the description of the figures.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description. In particular, many of the various aspects and features of the invention are most easily understood by those skilled in the art when conveyed as user interface features. However, those skilled in the art will appreciate that the user interface elements illustrated and described are examples, and the invention is not to be limited by those user interface features specifically illustrated in the drawings.

Consistent with an embodiment of the invention, a graphical user interface object (e.g., a user-selectable button, hyperlink, graphic, icon, banner, text, label, or widget, etc.) displayed on an internet document provides a user with the ability to invoke a highlighting service to operate with the currently displayed internet document. For instance, the graphical user interface object may be a simple button, referred to herein as a Highlight Anywhere Button, or generally as a Highlighter button. When a user selects (e.g., with a mouse or pointing device) the button, executable code associated with the button causes a request to be communicated to a highlighter server hosting a highlighting service. In one embodiment of the invention, the request includes the address or uniform resource locator (URL) of the currently displayed internet document. Accordingly, the highlighter server responds to the request by enabling the highlighting service with the currently displayed internet document, thereby enabling a user to highlight portions of the currently displayed document for later retrieval and/or sharing.

Figure 1:
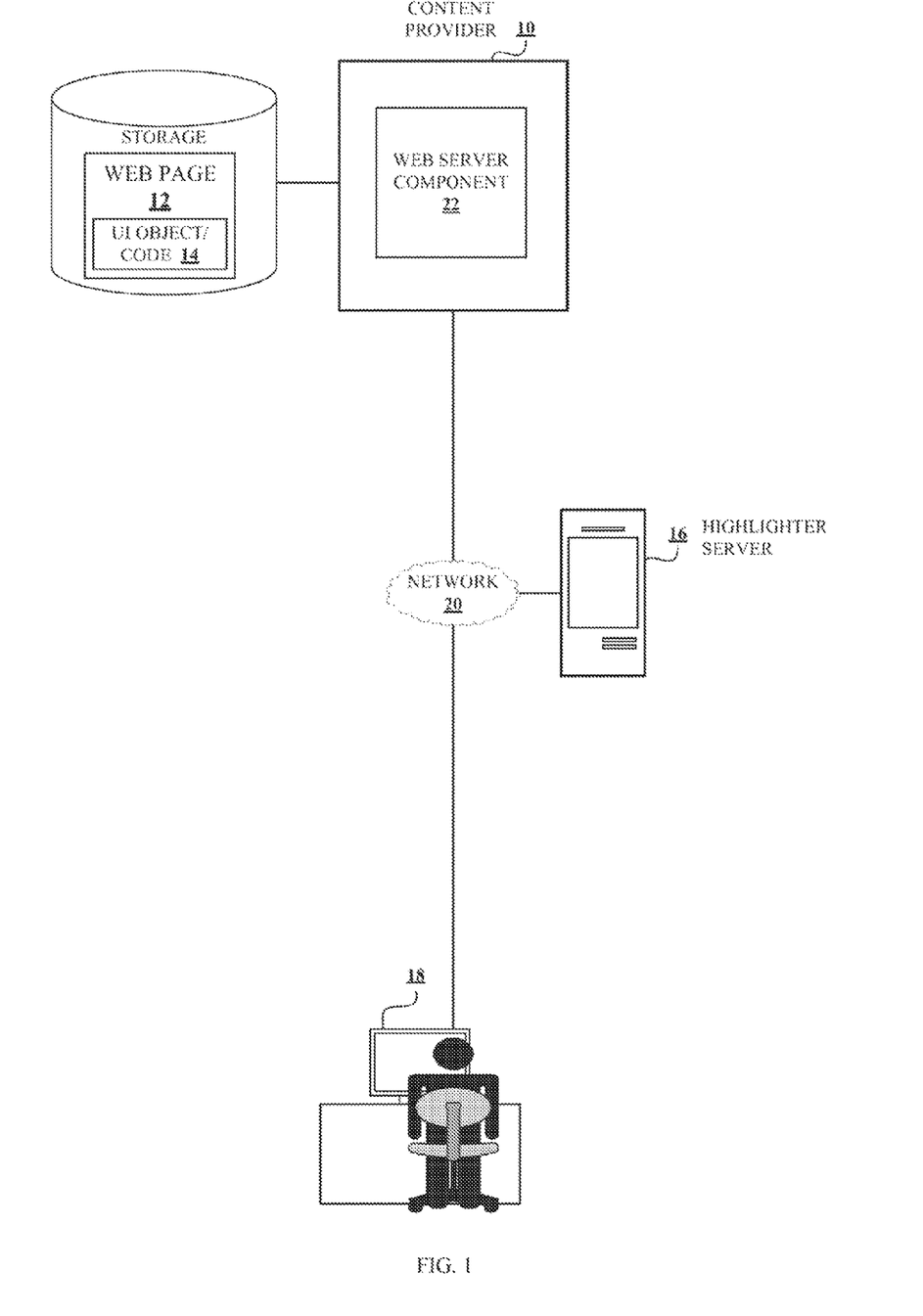
FIG. 1 illustrates an example of a network environment including a content provider for serving a web document with a user interface object for directly invoking a highlighting service, according to an embodiment of the invention.

FIG. 1 illustrates an example of a computer network environment including a content provider server 10 for serving an internet document or web page 12 with a Highlighter button 14, and a highlighting server 16 configured to provide a highlighting service, according to an embodiment of the invention. As illustrated in FIG. 1, the highlighter server 16 is communicatively coupled by means of a network 20 to a content provider server 10. In addition, the highlighter server 16 is communicatively coupled by means of a network 20 to a user's client computer 18. The content provider server 10 includes a web server component 22 for serving various internet documents and related objects, including a user interface object consistent with an embodiment of the invention. As illustrated in FIG. 1, the content provider server 10 is illustrated as a single device. However, those skilled in the art will appreciate that in alternative embodiments, the content provider may include several servers working in conjunction with one another in a distributed manner to respond to document requests by serving documents and related objects from storage. Furthermore, in an alternative embodiment of the invention, the highlighting service may execute on the content provider server, or another server under the control of the content provider.

In general, a user utilizes a web browser application on client computer 18 to access and display content in the form of internet documents or web pages, which may be stored in whole or in part on the content provider server 10. The content provider server 10 serves an internet document or web page 12 that includes a user interface object for invoking a highlighting service. That is, the web page 12 served by the content provider server 10 includes a Highlight Anywhere Button, consistent with an embodiment of the invention, which, when displayed in a web browser application and selected by a user, causes a highlighting service to be invoked with the web page 12.

Once a highlighter session has been invoked, a user has at his or her disposal a variety of tools for highlighting text and objects of the web page 12. For instance, in one embodiment of the invention, a highlighter tool panel will appear in the web browser window and provide the user with a selection of controls enabling various features and functions of the highlighting service. In another embodiment of the invention, various controls may be provided by a highlighter toolbar. In any case, the basic function of the highlighting service is to enable a user to highlight an object (e.g., text, graphical images, or a combination) of the web page 12, such that the highlighted portion(s) can easily be recalled at a later time and/or shared with other users. Accordingly, as the user highlights an object, the highlighted object, or portions thereof, are communicated to the highlighter server 16 where it may optionally be stored. In one embodiment of the invention, the highlighted object (e.g., a selection of text) is stored along with any annotations the user may have added, as well as a date and time indicating when the highlight was generated. The highlighted object and its associated data are stored in such a manner as to be optionally associated with the user who generated the highlight. This allows the user to recall and view highlights from previous highlighting sessions. Other aspects and features of the highlighting service are described in related and co-pending U.S. patent application Ser. No. 11/766,786, entitled "Method and Apparatus for Highlighting a Portion of An Internet Document for Collaboration and Subsequent Retrieval" filed on Jun. 21, 2007, which is hereby incorporated herein by reference.

Figure 2:
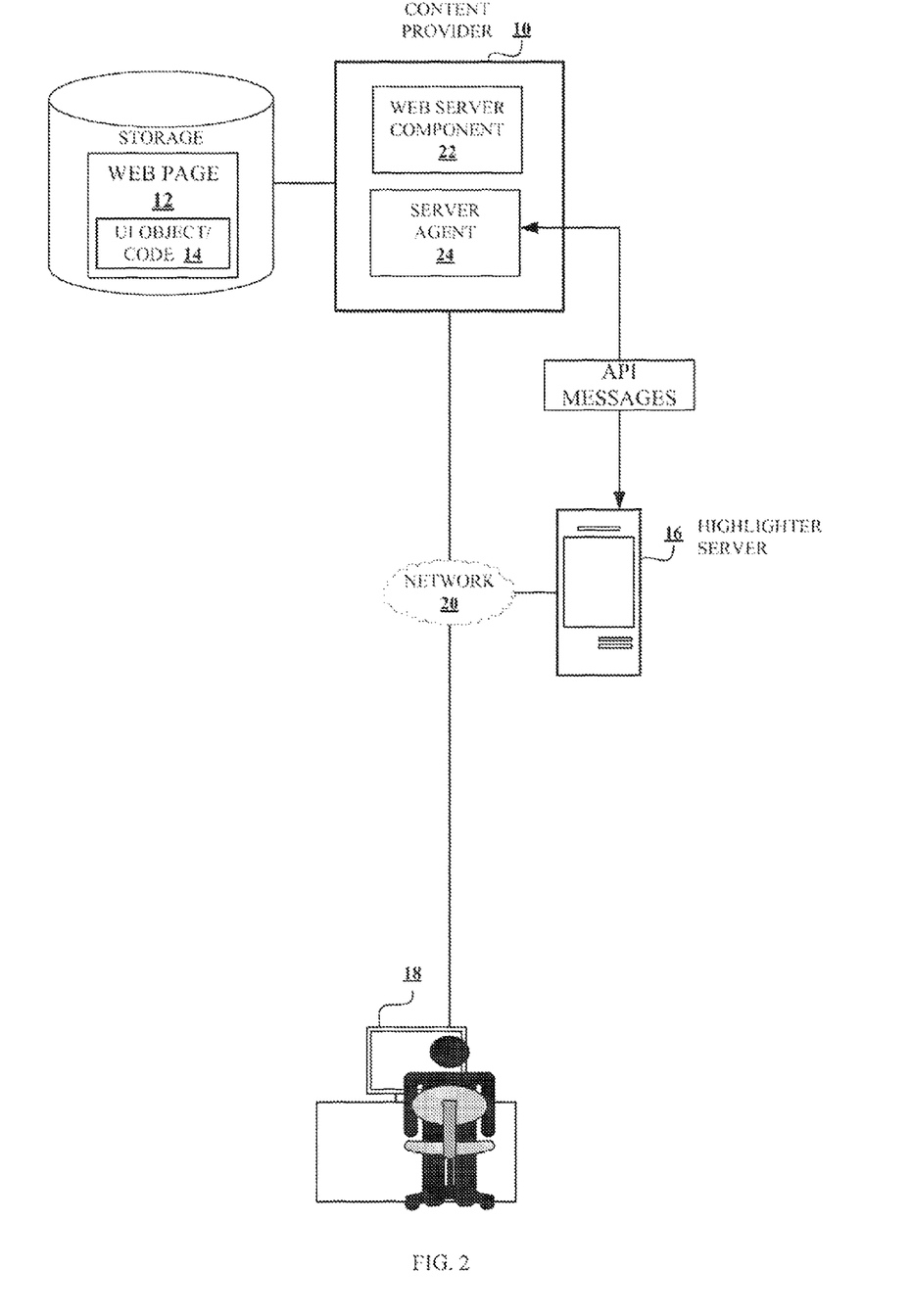
FIG. 2 illustrates an example of a network environment including a content provider with a software agent for indirectly invoking a highlighting service via a system of application programming interface (API) calls, according to an embodiment of the invention.

As illustrated in FIG. 1, when a user invokes the highlighting service by selecting the Highlighter button on the web page in his or her browser, the browser communicates a request directly to the highlighter server 16. As illustrated in FIG. 2, in an alternative embodiment of the invention, the content provider server 10 includes a highlighter service agent, which works in conjunction with the web server component 22 to communicate messages (e.g., API messages) to the highlighter server 16. Accordingly, when a user selects a Highlighter button to invoke a highlighting service, a request is communicated from the client browser 18 to the content provider web server component 22. In turn the request is handled by the highlighter service agent 24, which communicates an API call to the highlighter server 16, thereby invoking the highlighting service.

In one embodiment of the invention, the highlighter service agent 24 is provided by the operator of the highlighting service to the enterprise. For example, the highlighting service operator may configure the highlighter service agent 24 to be integrated with and work with the content provider's server as well as the highlighting service. Accordingly, the highlighter service agent 24 can be customized to support and provide those highlighting features desired and requested by a particular enterprise. For instance, an enterprise offering a news website may desire a subset of highlighting service features specific to its website, and different from the subset of features that may be desired and/or requested by an enterprise providing a social networking website. The highlighter service agent 24 can be configured on a per enterprise basis, and enables each enterprise to seamlessly integrate a highlighting service to work with its website.

Although the highlighter server 16 is shown to be a separate node on the network 20, in an alternative embodiment of the invention, the highlighting service provided by the highlighting server may be integrated with, or reside on, the content provider server 10 or another server maintained and/or operated by the content provider.

Figure 3:
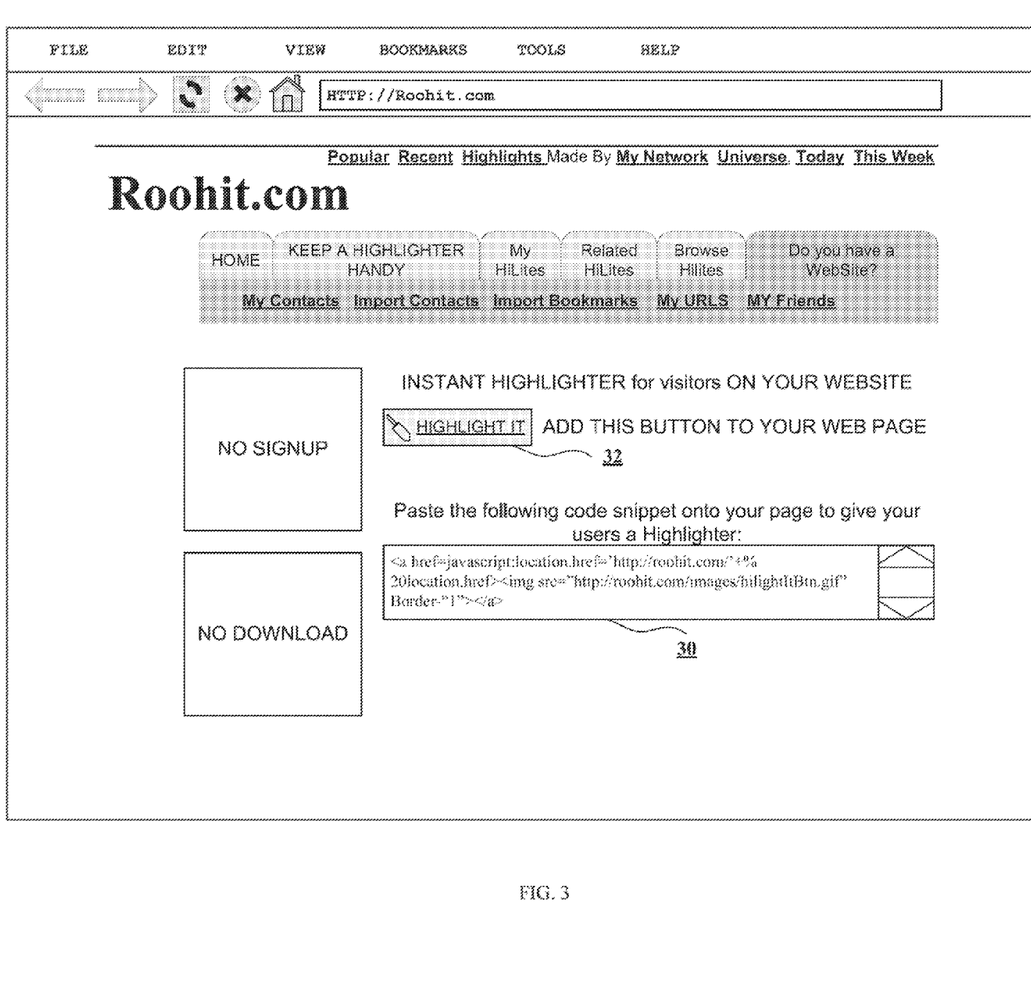
FIG. 3 illustrates an example of a web page providing a snippet of code for adding highlighter functionality to a third-party web page, according to an embodiment of the invention.

FIG. 3 illustrates an example of a web page providing a snippet of code for adding highlighter functionality to a third-party web page, according to an embodiment of the invention. The web page shown in FIG. 3 may be included as part of a web portal for the highlighting service. Accordingly, the highlighting service may simplify the process of providing highlighter functionality on other websites by providing a snippet of code that other content providers and web-based authors can easily copy and paste into their own web pages. As illustrated in FIG. 3, the snippet of code 30 can easily be added to a third party web page by copying and pasting the code.

In one embodiment of the invention, once the code is embedded in a another web page (e.g., the target web page), the code will cause a button, such as the button with reference number 32 in FIG. 3, to be displayed on the target web page when the page is rendered by a web browser application. When a user selects the button, a highlighting session will be invoked, and the user will be able to highlight text and/or objects on the target web page. This provides a simple way for content providers to enhance the functionality and usability of their websites.

In an alternative embodiment of the invention, the code automatically causes the client web browser to invoke a highlighting service, for example, without requiring a user to select or press a user interface object or button on the web page. For example, when the user loads the web page in which the code has been embedded, the client web browser will invoke the highlighting service to work with the web page.

The code snippet 30 illustrated in FIG. 3 may be provided via a web page served by the highlighting service. However, those skilled in the art will appreciate that an operator of the highlighting service may communicate or otherwise provide the code to an enterprise in a number of ways. For example, the code snippet for invoking the highlighting service may be emailed to an enterprise, or provided, for example, by a consultant.

Figure 4:
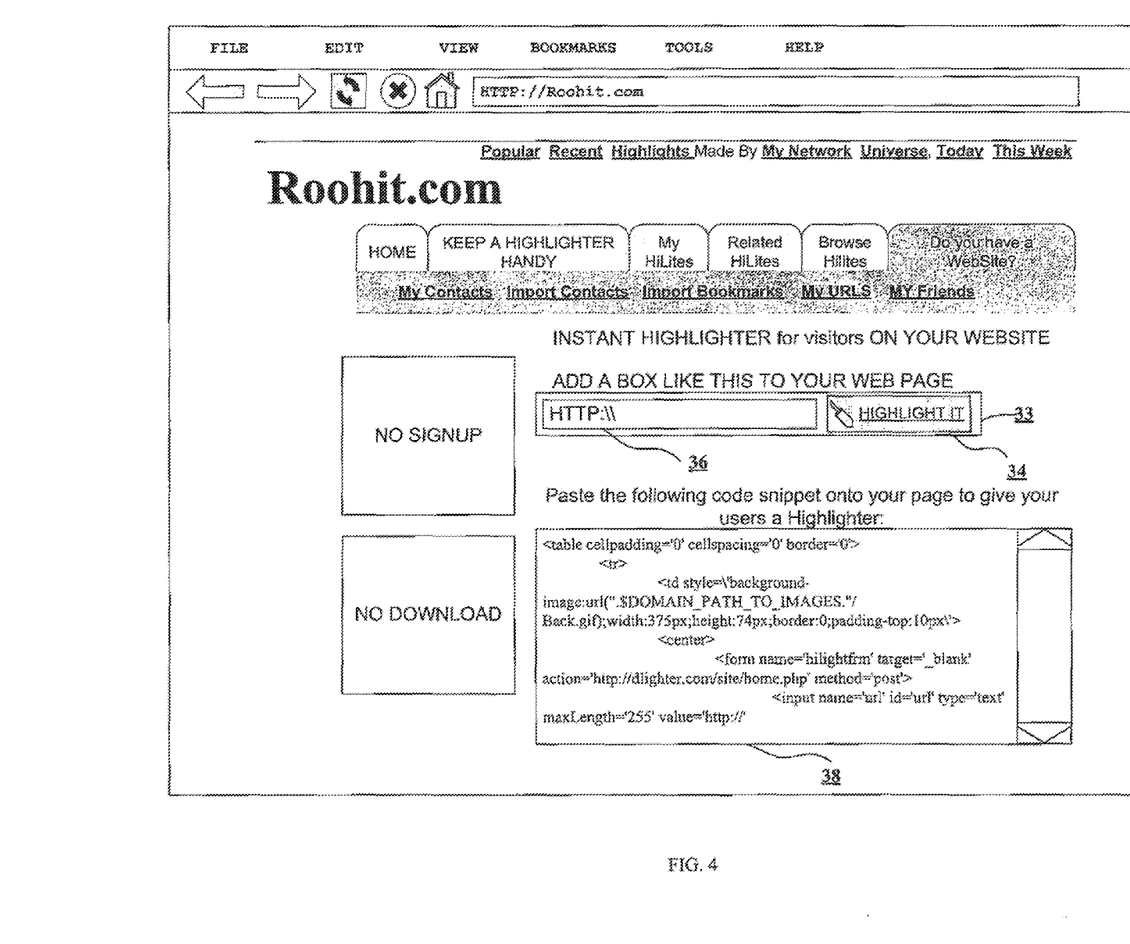
FIG. 4 illustrates an example of a web page providing a snippet of code for adding highlighter functionality to a third party web page, according to an embodiment of the invention.

FIG. 4 illustrates an example of a web page providing a snippet of code for adding highlighter functionality to a third-party web page, according to an embodiment of the invention. The web page illustrated in FIG. 4 is similar to the web page illustrated in FIG. 3, however, the web page of FIG. 4 includes a snippet of code 38 to provide a user interface object (e.g., box 33) including an address bar 36 as well as a highlighter button 34. Accordingly, when the snippet of code 38 is embedded or inserted into another internet document, the internet document will display the box 33, along with the address bar 36 and button 34. This enables a user to enter an address or URL of an internet document and begin a highlighting session. For example, by selecting the button 34, the web browser will load the web page associated with an address entered in address bar 36 enabling a user to create highlights on that web page.

Figure 5:
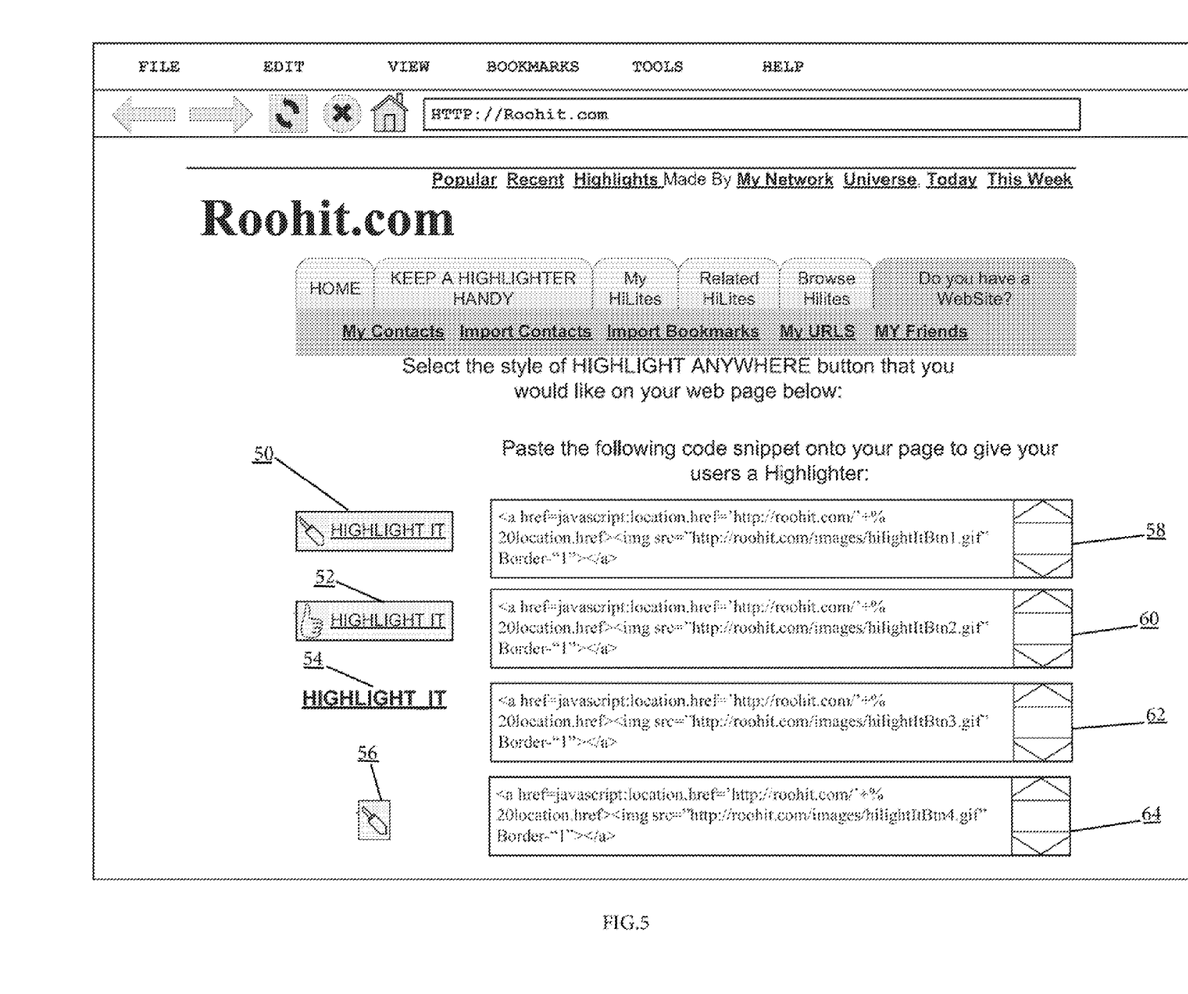
FIG. 5 illustrates an example of a web page providing a selection of user interface objects, which may be used to invoke a highlighting service according to an embodiment of the invention.

FIG. 5 illustrates an example of a web page providing a selection of user interface objects (e.g., buttons, icons, links), which may be used to invoke a highlighting service according to an embodiment of the invention. As illustrated in FIG. 5, the highlighting service may include a web page that provides other content providers with a variety of Highlighter buttons for use with their web pages. Accordingly, the highlighting service may display a variety of user interface objects (e.g., buttons 50, 52, 54, and 56) and a snippet of code (e.g., code snippet 58, 60, 62, and 64) associated with each user interface object. A content provider simply selects the particular style of user interface object he or she would like to include in a web page, and copies and pastes the associated code snippet for that web page into the target web page. Accordingly, the content provider need not get involved with figuring out the appropriate addresses and writing the necessary code to invoke a highlighting service with a web page.

Figure 6:
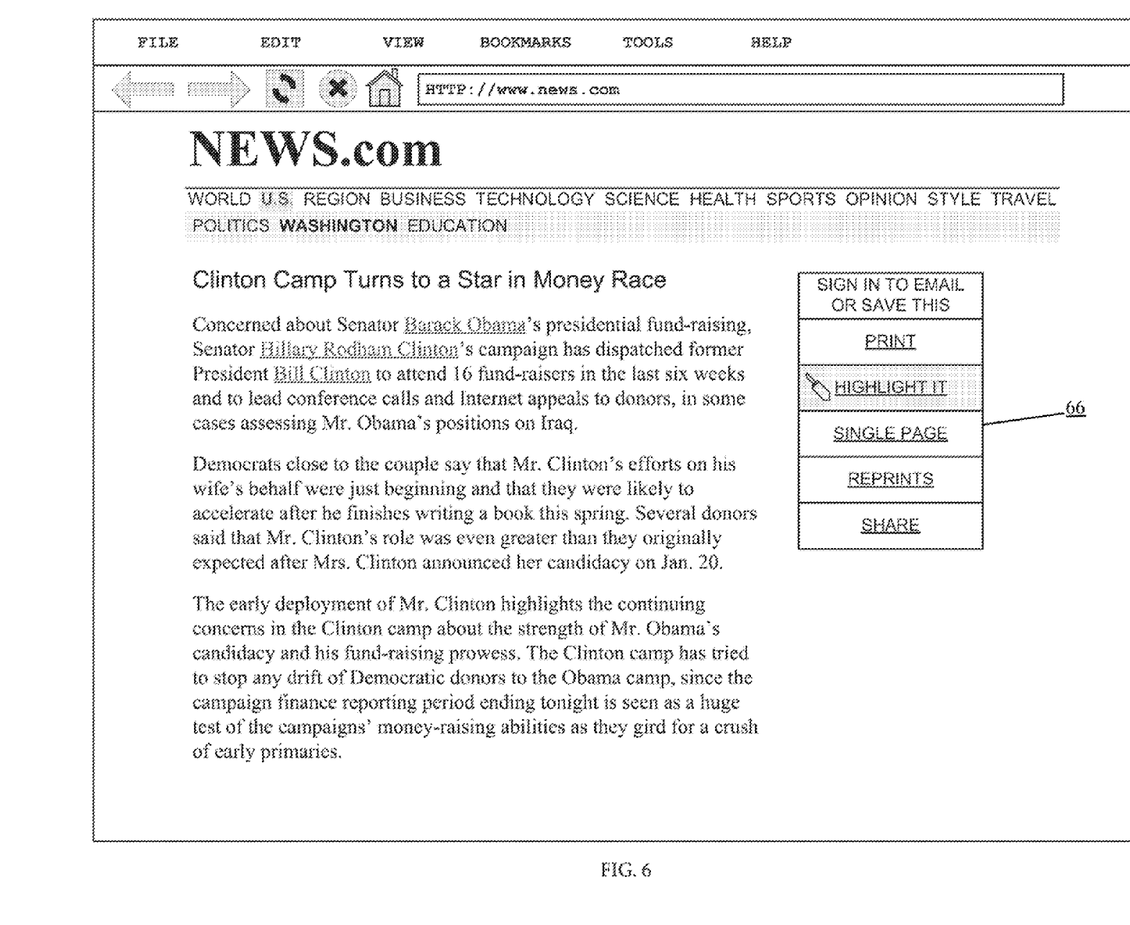
FIG. 6 illustrates an example of a news-related web page with a user interface object enabling highlighter functionality provided by a highlighting service, according to an embodiment of the invention.

FIG. 6 illustrates an example of a news-related web page with a user interface object enabling highlighter functionality provided by a highlighting service, according to an embodiment of the invention. As illustrated in FIG. 6, a news-related web site with URL www.news.com provides a variety of news articles to its users. In addition, a variety of user interface objects enable or allow other functions, such as emailing a link of a particular news articled to another user, or formatting a news story to be printed. Consistent with an embodiment of the invention, a user interface object—for example, the "Highlight It" button 66—provides users with a simple mechanism for invoking a highlighting service to work with the web page that is currently being displayed. By simply selecting the "Highlight It" button 66, a request is communicated to the highlighting service hosted at the highlighting server 16, thereby invoking the highlighting service. The request may be communicated directly (e.g., front the web browser to the highlighting service) or indirectly (e.g., via a highlighter service agent operating in conjunction with the content provider's web server). In any case, the highlighting service allows users to highlight objects (e.g., text and/or images) on the currently displayed web page, along with a variety of other related features and functions. In one embodiment of the invention, highlights can easily be shared with other users. Consequently, the "Highlight it" button makes it easy for one user to highlight and share a particular passage in a news article with another person.

Figure 7:
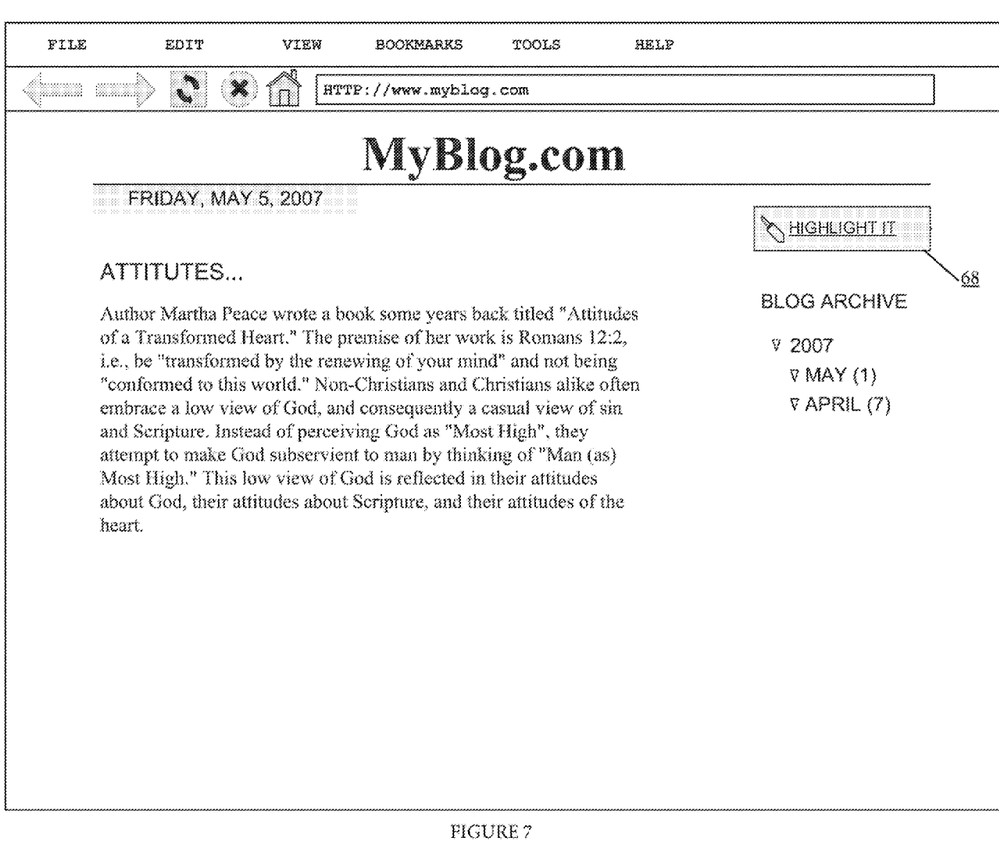
FIG. 7 illustrates an example of a blog web page with a user interface object enabling highlighter functionality provided by a highlighting service, according to an embodiment of the invention.

FIG. 7 illustrates an example of a blog web page with a user interface object 68 enabling highlighter functionality provided by a highlighting service, according to an embodiment of the invention. Like the user interface object 66 of FIG. 6, the "Highlight It" button 68 on the blog web page of FIG. 7 provides a simple mechanism for invoking a highlighting service to work with the currently displayed web page. Accordingly, a user can easily invoke a highlighting service to share a blog entry, or a portion of a blog entry, with another person.

Figure 8:
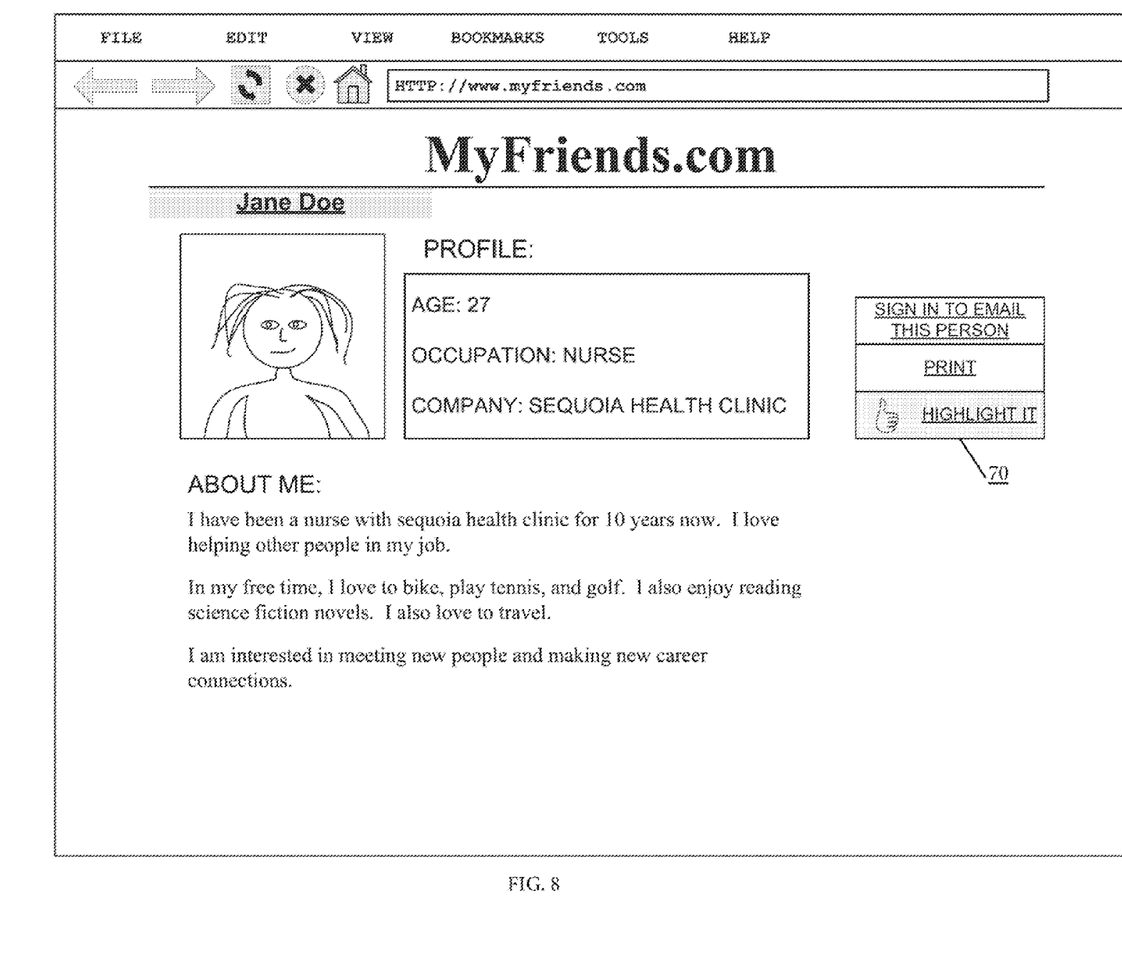
FIG. 8 illustrates an example of a user profile web page including two user interface objects and for invoking a highlighting service, according to an embodiment of the invention.

FIG. 8 illustrates an example of a user profile web page including a user interface object 70 for invoking a highlighting service, according to an embodiment of the invention. As illustrated in FIG. 8, the "Highlight It" button enables users of a social networking site to highlight aspects of a user's profile, and share the highlights with others.

Figure 9:
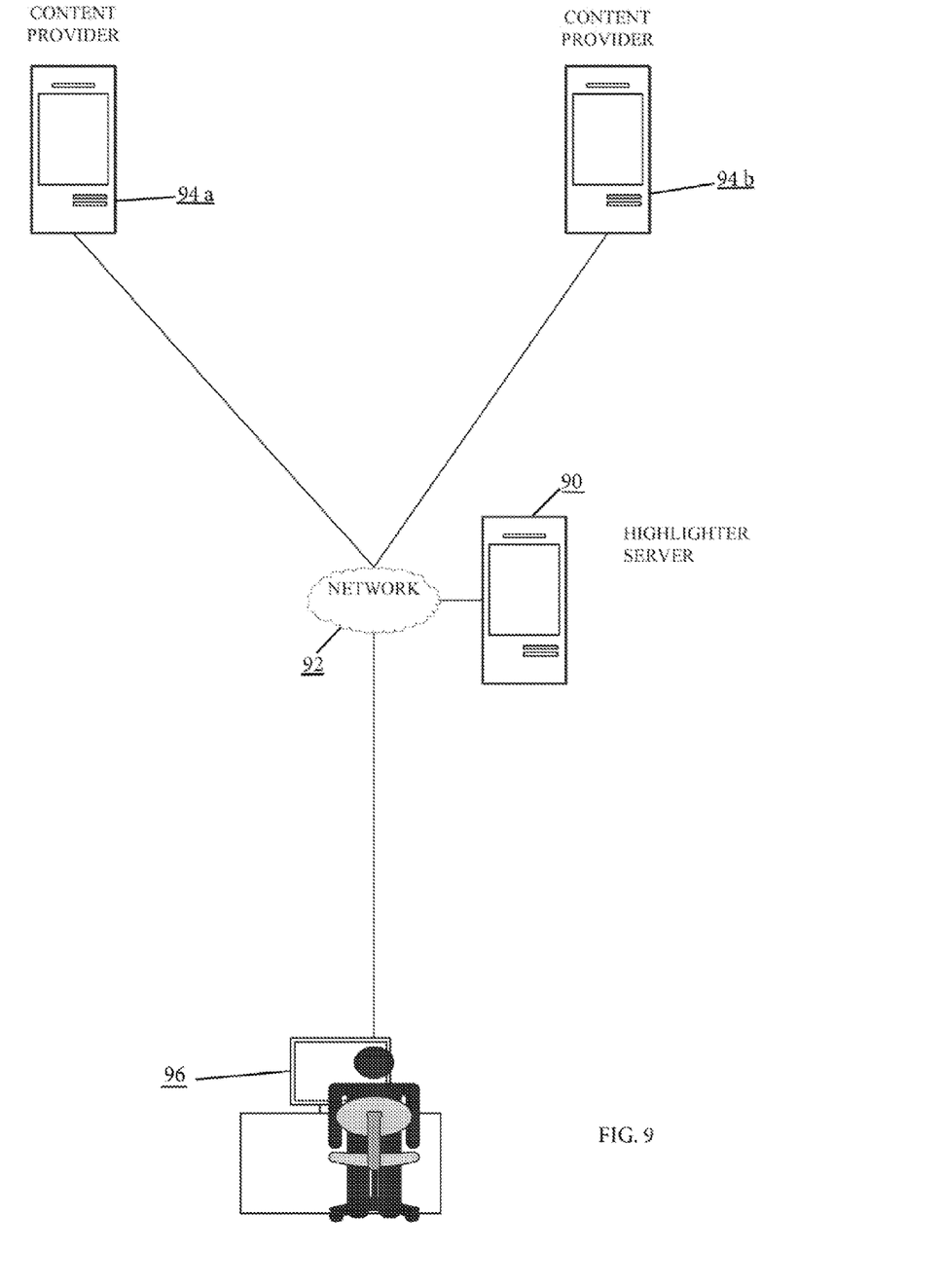
FIG. 9 illustrates an example computer network environment including a highlighter server.

FIG. 9 illustrates an example of a computer network environment including a highlighter server 90, according to an embodiment of the invention. As illustrated in FIG. 9, the highlighter server 90 is communicatively coupled by means of a network 92 to several content provider servers (e.g., 94-a and 94-b). In addition, the highlighter server 90 is communicatively coupled by means of a network 92 to a user's client computer 96. It will be appreciated by those skilled in the art that the computing environment illustrated in FIG. 9 is but one example, and a wide variety of computer and network configurations might be used without departing from the spirit of the invention. For instance, the user computer, although depicted in FIG. 9 as a desktop computer, may be any of a wide variety of computing devices, including but not limited to: desktop computer, laptop computer, personal digital assistant, or mobile handset. Furthermore, although in the examples provided herein the highlighter server 90 is shown as a separate component, in one embodiment of the invention the highlighting service executing on the highlighter server 90 may reside and execute on a content provider server (e.g., 94-a, or 94-b), or a server under the control of a content provider.

In general, the user utilizes a web browser application on client computer 96 to access and display content in the form of internet documents or web pages, which are stored in whole or in part on various content providers (e.g., 94-a and 94-b). In one embodiment of the invention, a user invokes the highlighter service by prepending the address or uniform resource locator (URL) of the highlighter server 90 prior to the URL of an internet document that the user is requesting. In one embodiment of the invention, a bookmarklet, which is a button with associated code that typically resides on a web browser toolbar, automatically prepends the address of the highlighting server to the address of a document, thereby invoking the highlighting service.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as a set of instructions stored on a computer-readable medium. The scope of the invention is defined by the claims and their equivalents.

What is claimed is:

1. A computer-program product enabling content selection, the computer-program product comprising a non-transitory computer-readable medium having instructions executed by a processor on a content server, the content server to perform the steps of:
  receiving a request for an internet document from a client web browser;
  serving the internet document from the content server to the client web browser, wherein the internet document includes a code snippet for invoking a content selection service to operate with the internet document, the content selection service hosted at a content selection server which is different than the content server hosting the internet document and the code causing a user interface object for invoking the content selection service to be displayed by the client web browser in connection with the internet document;

responsive to a user selecting the user interface object in the client web browser, the client web browser communicating a request to the content selection server to invoke the content selection service;

responsive to the request to invoke the content selection service, the content selection server enabling the content selection service for the internet document;

responsive to the content selection service being enabled for the internet document, displaying in the client web browser tools for selecting objects of the internet document, said tools represented in a content selection panel in the client web browser and said tools configured to provide the user with a selection of one or more controls enabling one or more features and functions of the content selection service; and responsive to the user selecting an object in the internet document, communicating the selected object or a representation thereof to the content selection server for storage in such a manner as to be associated with the user who selected the object.

2. The computer-program of claim 1, wherein the code snippet that invokes the web-based content selection service does so without requiring a user to establish a new user account in order to utilize the web-based user content selection service.

3. The computer-implemented method of claim 1, wherein the web-based user content selection service, enables sharing of the portion of the internet document, or one or more representations thereof.

4. A server, with at least one processor, comprising:
a web content server module for serving an internet document to a client web browser, wherein the internet document includes a code snippet to invoke a content selection service to operate with the internet document, the content selection service hosted at a web server which is different than the content server hosting the internet document and the code causing a user interface object for invoking the content selection service to be displayed by the client web browser in connection with the internet document;

responsive to a user selecting the user interface object in the client web browser, the client web browser communicating a request to the content selection server to invoke the content selection service;

responsive to the request to invoke the content selection service, the content selection server enabling the content selection service for the internet document;

responsive to the content selection service being enabled for the internet document, displaying in the client web browser tools for selecting text, images, and objects of the internet document, said tools represented in a content selection panel in the client web browser and said tools configured to provide the user with a selection of one or more controls enabling one or more features and functions of the content selection service; and responsive to the user selecting an object in the internet document, communicating the selected object or a representation thereof to the content selection server for storage in such a manner as to be associated with the user who selected the object.

5. The server of claim 4, wherein the web-based user content selection service is customizable to provide a web-based user content selection service feature requested by an enterprise.

6. The server of claim 4, wherein the web-based user content selection service stores another user's content portions via an applications programming interface.

7. The server of claim 4, wherein the internet document comprises a user interface object, and wherein the user interface object comprises a graphic, a text, a hyperlink, a widget or a multimedia object, and when selected, the user interface object causes the client web browser to invoke the web-based user content selection service.

8. The server of claim 4, wherein the web-based user content selection service enables sharing of the one or more content portions, or one or more representations, thereof.

9. The server of claim 4, wherein the code snippet to invoke a web-based user content selection service comprises one or more configuration settings that determine one or more settings of the web-based user content selection service.

10. The server of claim 4, wherein the code snippet to invoke the web-based user content selection service does so without requiring a user to establish a new user account in order to utilize the web-based user content selection service.

11. The server of claim 4, wherein the code snippet to invoke the web-based user content selection service does so without installing a custom software component on a client.

12. The server of claim 4, wherein the code snippet to invoke the web-based user content selection service is provided by a web-based user content selection service.

13. The server of claim 12:
wherein the code snippet to invoke the web-based user content selection service is provided via a web page, and
wherein the code snippet to invoke the web-based user content selection service is customized via a parameter selected via the web page.

14. A computer-implemented method for enabling content selection, comprising executing on a processor the steps of:
at a content server, receiving a request for an internet document from a client web browser;
serving the internet document from the content server to the client web browser, wherein the internet document includes code for invoking a content selection service to operate with the internet document, the content selection service hosted at a content selection server which is different than the content server hosting the internet document and the code causing a user interface object for invoking the content selection service to be displayed by the client web browser in connection with the internet document;
responsive to a user selecting the user interface object in the client web browser, the client web browser communicating a request to the content selection server to invoke the content selection service;
responsive to the request to invoke the content selection service, the content selection server enabling the content selection service for the internet document;
responsive to the content selection service being enabled for the internet document, displaying in the client web browser, one or more tools, for selecting objects of the internet document, said tools represented in a content selection panel in the client web browser and said tools configured to provide the user with a selection of one or more controls enabling one or more features and functions of the content selection service; and
responsive to the user selecting an object in the internet document, communicating the selected object or a representation thereof to the content selection server for storage in such a manner as to be associated with the user who selected the object.

15. The computer-implemented method of claim 14, wherein a bookmarklet launches the content selection service on the client web browser.

16. The computer-implemented method of claim 14, wherein the server storing the user's selection, and the server hosting the internet document are controlled by the same enterprise.

17. The computer-implemented method of claim 14, wherein a content selection service does not require the user to establish a new user account in order to utilize the content selection service.

18. The computer-implemented method of claim 14, wherein the content selection service enables the user to share one or more representations of the portion of the content of the internet document.

19. The computer-implemented method of claim 14:
    wherein a code that invokes the content selection service is generated and provided via a web page, and
    wherein the code can be customized via parameters selected also using a web page.

20. The computer-implemented method of claim 14, wherein a code that invokes the content selection service comprises one or more configuration settings that determine one or more settings of the content selection service.

\* \* \* \* \*